United States Patent
Wingrove et al.

(10) Patent No.: US 7,679,937 B2
(45) Date of Patent: Mar. 16, 2010

(54) FLYBACK CONVERTER PROVIDING SIMPLIFIED CONTROL OF RECTIFIER MOSFETS WHEN UTILIZING BOTH STACKED SECONDARY WINDINGS AND SYNCHRONOUS RECTIFICATION

(75) Inventors: Michael J. Wingrove, Kanata (CA); David R. Malecki, Stittsville (CA)

(73) Assignee: Ciena Corporation, Linthicum, MD (US)

( * ) Notice: Subject to any disclaimer, the term of this patent is extended or adjusted under 35 U.S.C. 154(b) by 288 days.

(21) Appl. No.: 11/786,147

(22) Filed: Apr. 10, 2007

(65) Prior Publication Data

US 2008/0253150 A1    Oct. 16, 2008

(51) Int. Cl.
*H02M 3/335*    (2006.01)
(52) U.S. Cl. ...................... 363/21.12; 363/89
(58) Field of Classification Search ............. 363/16–20, 363/24–25, 89, 97, 127; 323/222, 282–288, 323/266
See application file for complete search history.

(56) References Cited

U.S. PATENT DOCUMENTS

| | | | |
|---|---|---|---|
| 5,552,695 A | | 9/1996 | Schwartz |
| 5,991,171 A | * | 11/1999 | Cheng .................. 363/21.03 |
| 6,987,679 B2 | * | 1/2006 | Gan et al. .................. 363/89 |
| 2004/0257838 A1 | | 12/2004 | Gan et al. |

OTHER PUBLICATIONS

Xuefel Xie, Joe Chui Pong Liu, Frankl Ngai Kit Poon, Man Hay Pong; "Current-Driven Synchronous Rectification Technique for Flyback Topology", Dept of Electrical & Electronic Engineering-University of Hong Kong, 6 pages; IEEE 2001.

Robert Kollman; "Achieving High-Efficiency with a Multi-Output CCM Flyback Supply Using Sett-Driven Synchronous Rectifiers", 25 pages; Texas Instruments 2003.

Ionel Dan Jitaru; "High Efficiency Flyback Converter Using Synchronous Rectification"; 5 pages; IEEE 2002.

Michael T. Zhang, Milan M. Jovanovie, Fred C. Y. Lee; "Design Considerations and Performance Evaluations of Synchronous Rectification in Flyback Converters", IEEE Transactions on Power Electronics; 9 pages; vol. 13, No. 3, May 1998.

Tom Hack; Flyback Controller Improves Cross Regulation for Multiple Output Applications—Design Note 344; 2 pages; Linear Technology Corporation 2004.

POE Power Supply 5V/2A or 3.3V/3A; Drawing No. PMP929; 2 pages; Texas Instruments Oct. 28, 2004.

POE Power Supply, Drawing No. PMP411; 2 pages; Texas Instruments Feb. 26, 2003.

* cited by examiner

*Primary Examiner*—Rajnikant B Patel
(74) *Attorney, Agent, or Firm*—Clements Bernard PLLC; Christopher L. Bernard; Tyler S. Brown

(57) ABSTRACT

The present invention provides methods and systems for a flyback converter arranged with synchronous rectifier MOSFETS in such a manner that they operate with a common source potential while still providing for the use of a stacked output winding. With a common source potential, a single rectifier control voltage can be used to operate the rectifiers for multiple outputs greatly simplifying the control circuit. Advantageously, the present invention maintains the inherent simplicity of the flyback design while enabling designs with well-regulated multiple voltage outputs and the efficiency benefits of synchronous rectification.

19 Claims, 11 Drawing Sheets

FIG. 6. *Prior Art*

FLYBACK CONVERTER PROVIDING SIMPLIFIED CONTROL OF RECTIFIER MOSFETS WHEN UTILIZING BOTH STACKED SECONDARY WINDINGS AND SYNCHRONOUS RECTIFICATION

FIELD OF THE INVENTION

The present invention relates generally to a power switching flyback converter circuit. More specifically, the present invention provides a flyback converter with simplified control of rectifier MOSFETS when utilizing both stacked secondary windings and synchronous rectification.

BACKGROUND OF THE INVENTION

A switching power converter transfers power from an input supply voltage source to one or more output voltage supply sources. In general, this is done by using the input supply to transfer energy to a storage element and then transferring the stored energy in a controlled manner to the output. In most commonly used switching power converters the energy is stored in some form of inductor; the exception being a class of converter known as a "charge pump" which stores energy in a capacitor. There are a variety of different switching converter topologies (circuits) such as buck, flyback, forward, sepic, half bridge, full bridge, and the like with the fundamental difference being how the inductive components are used to store the energy.

The flyback converter topology is commonly used in low- to mid-power switching converter designs because the low component count typically results in a small and inexpensive design. For example, these converters are commonly used in broadband access devices, such as digital subscriber loop (DSL), power over Ethernet (POE), cable modems, and the like. Advantageously, the flyback converter topology is well understood to be the simplest form of switching power converter design—requiring the minimum number of magnetic and rectifier components—that still provides input to output isolation. This simplicity and the associated low cost ensure that the flyback converter is likely the most commonly-used switching converter topology notwithstanding a few limitations.

Referring to FIG. 1, a single output flyback converter 10 with a conventional rectifier is illustrated. The flyback converter 10 includes a voltage source, $V_{in}$, 11, an output voltage, $V_{out}$, 12, a switch 13, a transformer 14, a diode 15, and a capacitor 16. When the switch 13 is on, the primary of the transformer 14 is directly connected to the input voltage source 11. This results in an increase of magnetic flux in the transformer 14. The voltage across the secondary winding is negative, so the diode 15 is reverse-biased (i.e., blocked). The output capacitor 16 supplies energy to the output load. When the switch 13 is off, the energy stored in the transformer 14 is transferred to the output of the converter 10.

Referring to FIGS. 2 and 3, it is also well known in the art that flyback converters 20,30 can be configured in a variety of ways to provide multiple output voltages. For example, FIG. 2 illustrates a dual output flyback converter 20 including a transformer 24 with parallel windings. Alternatively as illustrated in FIG. 3, one common approach is to utilize a flyback transformer 34 (or coupled inductor) with a "stacked" secondary winding 35,36. The stacked winding 35,36 arrangement results in improved cross regulation between the multiple output voltages due to the (partial) commonality in winding conduction losses and leakage inductance induced effects.

Referring to FIG. 4, as is generally true with switching converter designs, the efficiency of a flyback converter can often be improved by replacing the conventional output rectifiers with metal-oxide-semiconductor field-effect transistor (MOSFET) devices operated as "synchronous" rectifiers. FIG. 4 illustrates a single output flyback converter 40 with a synchronous rectifier 42.

Currently, there does not exist stacked output windings (e.g., as illustrated in FIG. 3) combined with synchronous rectification (e.g., as illustrated in FIG. 4) in the flyback converter topology. State of the art converter designs either generate multiple outputs with synchronous rectification or they generate multiple outputs with a stacked secondary winding configuration but without the use of synchronous rectifiers. There are some examples where a stacked output winding is used together with hybrid rectification where the highest power output uses a synchronous rectifier and the remaining outputs use conventional rectifiers. For example, this is illustrated in "Power Over Ethernet-Sync Flyback Reference Design", available at focus.ti.com/docs/toolsw/folders/print/pmp411.html, PMP411, from Texas Instruments of Dallas, Tex. However, this does not utilize a stacked winding configuration for generating more than one voltage output while applying synchronous rectification to all of the outputs.

The use of hybrid rectification is appropriate when the additional outputs are required to deliver only small amounts of power compared to the output with the highest output power requirement. However, there are other applications when the efficiency and cross regulation improvements resulting from the use of synchronous rectification are desired on all outputs, such as a dual output converter where the power delivered from each output is in the range of perhaps 1:1 to 1:3.

Referring to FIG. 5, circuit diagram of a dual output flyback converter 50 with a synchronous rectifier is illustrated. When synchronous rectification is applied to the dual output converter 50 with parallel windings 58 all rectifier MOSFETs 52,54 are typically placed in the low side of the windings 58. This results in a common source voltage for the entire group of rectifier MOSFETs 52,54 which in turn allows a common gate signal 56 to be used to control all of the rectifier MOSFET gates 52,54.

Referring to FIG. 6, however, when synchronous rectification is applied to variants of the classical stacked winding topology, a flyback converter 60 has the resulting required rectifier 62,64 control signals referenced to different MOSFET source voltages, i.e. there is no common reference signal between the rectifiers 62,64. Thus the complexity of the rectifier control function is substantially increased due to the need for multiple MOSFET control voltages; at the very least these voltages must be derived through some form of level shifting and/or multiple control voltage windings.

Furthermore, a review of the literature shows that the exact operation of self-driven synchronous rectifier, forced continuous-current mode (CCM), flyback converters is not well understood. For example, Zhang et al. state in "Design Considerations and Performance Evaluations of Synchronous Rectification in Flyback Converters", IEEE Transactions On Power Electronics, Vol. 13, No. 3, May 1998, that the self driven mode is not possible in a flyback converter. Other references, such as Kollman, "Achieving High-Efficiency with a Multi-Output CCM Flyback Supply Using Self-Driven Synchronous Rectifiers", 2003, Texas Instruments, available at focus.ti.com/lit/ml/slup204/slup204.pdf, illustrate practical working examples of flyback converters with self driven synchronous rectification while neglecting to discuss the essential contribution of the transformer leakage inductance towards the desired operation of this topology. However, as pointed out in Xie et al., "Current-Driven Synchronous Rectification Technique For Flyback Topology", IEEE $32^{nd}$ Annual Power Electronics Specialists Conference, Volume 1, 2001, without sufficient leakage inductance in the power carrying windings of the transformer the MOSFETs in a self driven synchronously rectified converter will fail to commutate properly. The failure to commutate results in simultaneous current flow in both the primary and secondary windings of the flyback transformer which in turn typically results in a catastrophic failure of one or more of the MOSFET switches.

BRIEF SUMMARY OF THE INVENTION

In various exemplary embodiments, the present invention eliminates the complexity of multiple control voltages by arranging synchronous rectifier MOSFETs in such a manner that they operate with a common source potential while still providing for the use of a stacked output winding in a flyback converter topology. With a common source potential, a single rectifier control voltage can be used to operate the rectifiers for multiple outputs greatly simplifying the control circuit. The MOSFETs are arranged to provide a simple form of synchronous rectification. Advantageously, the present invention maintains the inherent simplicity of the flyback design while enabling designs with well-regulated multiple voltage outputs and the efficiency benefits of synchronous rectification.

The invention simplifies the gate drive requirements when using both a stacked output winding configuration and synchronous rectification in the flyback converter topology. In particular, when relying on a self driven synchronous rectification arrangement, only a single control winding is required to operate all of the synchronous rectifiers. This reduces the cost and size of the transformer by enabling the use of a lower pin count winding bobbin. Furthermore the application of a "commutation assist" inductor to the self-driven variant of the invention eliminates the reliance on the poorly controlled transformer leakage inductance, thus resulting in a design which is less sensitive to variations in the transformer construction improving the design yield and reliability. In summary the resulting design achieves improved performance while maintaining a minimum size and cost.

In an exemplary embodiment of the present invention, a dual-output flyback converter with stacked secondary windings and synchronous rectifiers arranged to provide a common reference for rectifier gate control includes a transformer with a first and second stacked secondary winding, a first synchronous rectifier connected to the first stacked secondary winding, and a second synchronous rectifier connected to the second stacked secondary winding, wherein the first and second synchronous rectifiers are arranged to provide a common reference for gate control of the first and second synchronous rectifier. A single rectifier control voltage is utilized to operate the first and second rectifiers. Optionally, the first and second rectifiers include a MOSFET. The dual-output flyback further includes a control winding on the transformer operable to control the first and second synchronous rectifiers, and the dual-output flyback converter is self driven in a forced continuous-current mode of operation. The dual-output flyback converter further includes a commutation assist inductor in the path of the control winding, wherein the commutation assist inductor minimizes leakage inductance. The dual-output flyback further includes stacked output capacitors.

In another exemplary embodiment of the present invention, a multiple-output flyback converter with stacked secondary windings and synchronous rectifiers arranged to provide a common reference for rectifier gate control includes a transformer with a plurality of stacked secondary windings, and a plurality of synchronous rectifiers arranged to provide a common reference for gate control of the plurality of synchronous rectifiers, wherein each of the plurality of synchronous rectifiers are connected to a corresponding stacked secondary winding of the plurality of stacked secondary windings, and there is a synchronous rectifier for each of the plurality of stacked secondary windings. A single rectifier control voltage is utilized to operate the plurality of synchronous rectifiers. Optionally, each of the plurality of synchronous rectifiers includes a MOSFET. The multiple-output flyback converter further includes a control winding on the transformer operable to control the plurality of synchronous rectifiers, and the multiple-output flyback converter is self driven in a forced continuous-current mode of operation. The multiple-output flyback converter of further includes a plurality of stacked output capacitors.

In yet another exemplary embodiment of the present invention, a flyback converter with stacked secondary windings and synchronous rectifiers arranged to provide a common reference for rectifier gate control includes an input voltage source connected to a transformer primary and a switch, a transformer with a plurality of stacked secondary windings, wherein the plurality of stacked secondary windings are coupled to the transformer primary through a core, a plurality of synchronous rectifiers, wherein each of the plurality of synchronous rectifiers are connected to a corresponding stacked secondary winding of the plurality of stacked secondary windings, and wherein the plurality of synchronous rectifiers are arranged to provide a common reference for gate control of the plurality of synchronous rectifiers, and a plurality of capacitors connected to the outputs of the plurality of stacked secondary windings. Optionally, the plurality of capacitors are stacked. A single rectifier control voltage is applied to the common reference to operate the plurality of synchronous rectifiers. Optionally, each of the plurality of synchronous rectifiers includes a MOSFET. The flyback converter of further includes a control winding on the transformer operable to control the plurality of synchronous rectifiers, and the multiple-output flyback converter is self driven in a forced continuous-current mode of operation.

BRIEF DESCRIPTION OF THE DRAWINGS

The present invention is illustrated and described herein with reference to the various drawings, in which like reference numbers denote like system components, respectively, and in which.

DETAILED DESCRIPTION OF THE INVENTION

In various exemplary embodiments, the present invention eliminates the complexity of multiple control voltages by arranging synchronous rectifier MOSFETs in such a manner that they operate with a common source potential while still providing for the use of a stacked output winding in a flyback converter topology. With a common source potential, a single rectifier control voltage can be used to operate the rectifiers for multiple outputs greatly simplifying the control circuit. The MOSFETs are arranged to provide a simple form of synchronous rectification. Advantageously, the present invention maintains the inherent simplicity of the flyback design while enabling designs with well-regulated multiple voltage outputs and the efficiency benefits of synchronous rectification.

The invention simplifies the gate drive requirements when using both a stacked output winding configuration and synchronous rectification in a flyback converter. In particular, when relying on a self driven synchronous rectification arrangement, only a single control winding is required to operate all of the synchronous rectifiers. This reduces the cost and size of the transformer by enabling the use of a lower pin count winding bobbin. Furthermore the application of a "commutation assist" inductor to the self-driven variant of the invention eliminates the reliance on the poorly controlled transformer leakage inductance, thus resulting in a design which is less sensitive to variations in the transformer construction improving the design yield and reliability. The commutation assist inductor has a very low value of inductance and stores a negligible amount of power that power is actually dissipated during switching rather than being transferred to the output.

Figure 1:
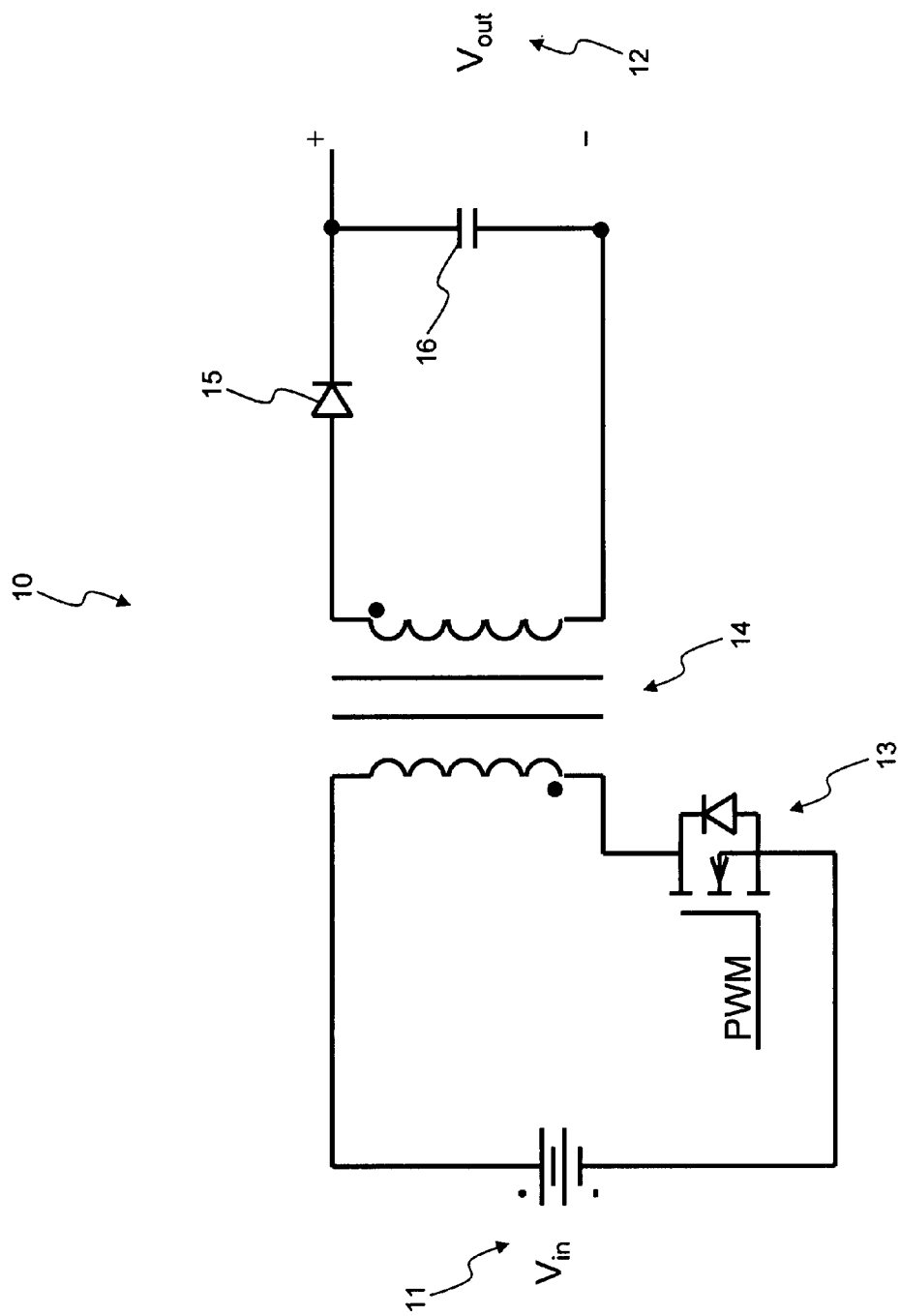
FIG. 1 is a circuit diagram of a single output flyback converter with a conventional rectifier.
Figure 2:
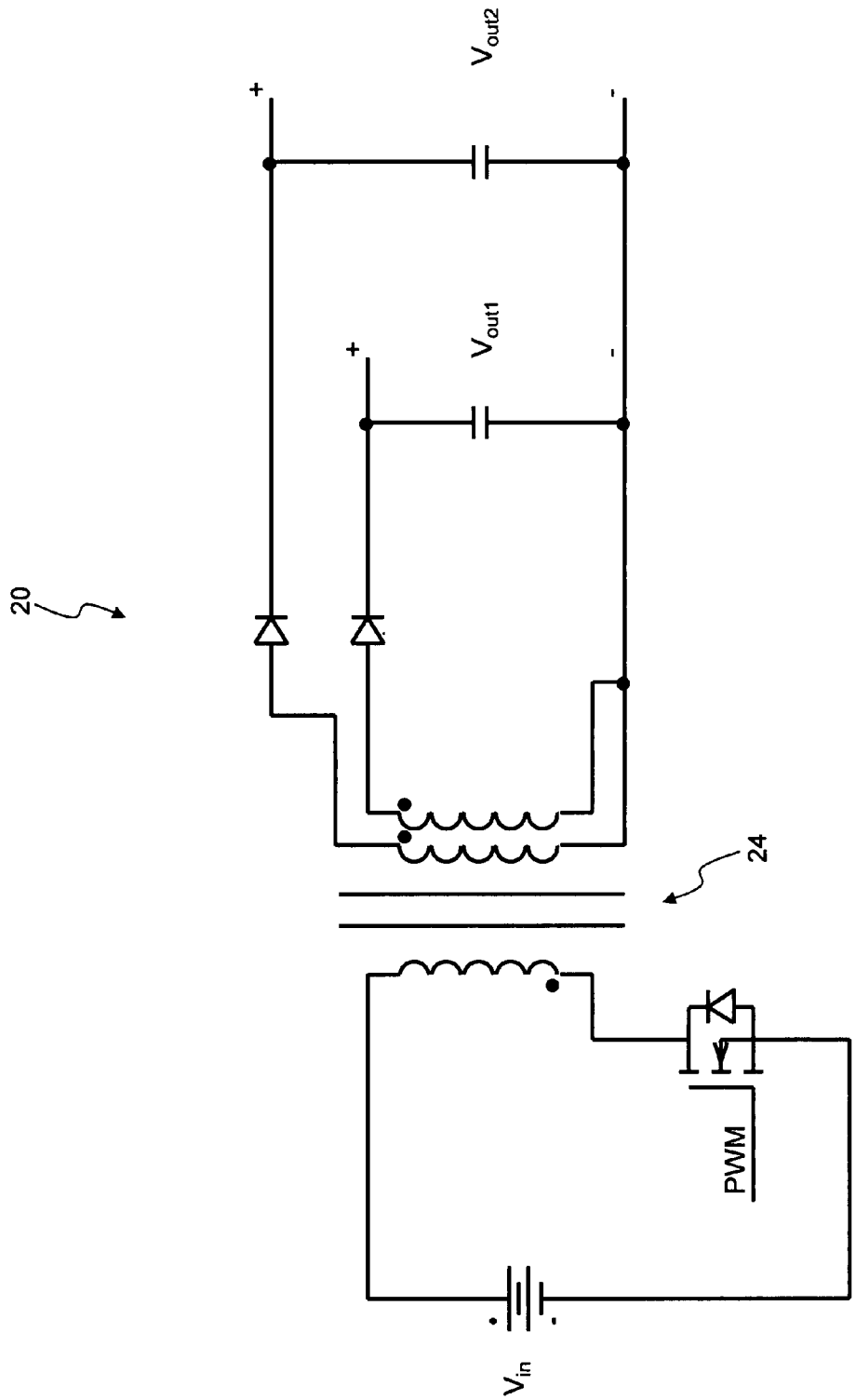
FIG. 2 is a circuit diagram of a dual output flyback converter with a conventional rectifier.
Figure 3:
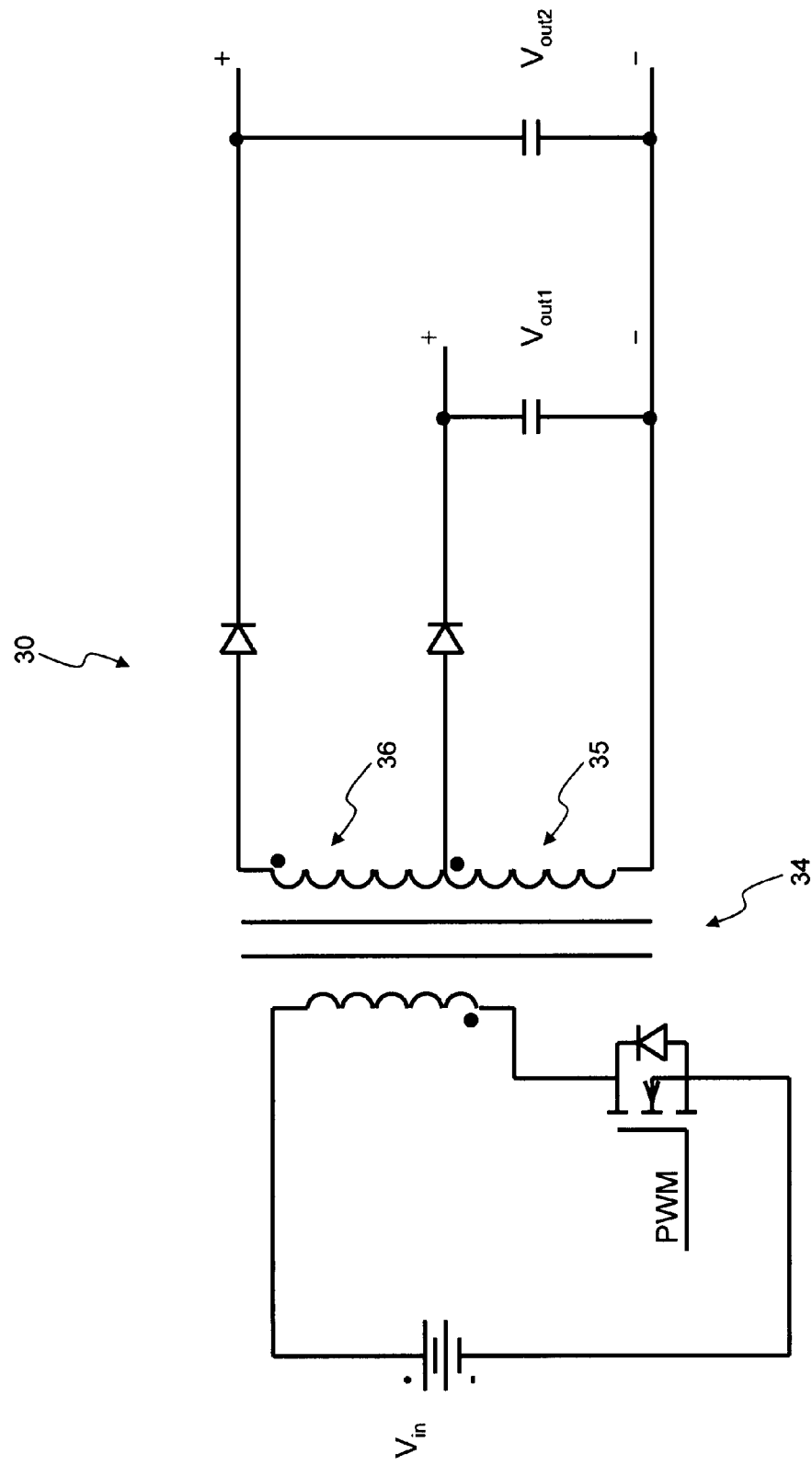
FIG. 3 is a circuit diagram of a dual output flyback converter with stacked secondary and conventional rectifiers.
Figure 4:
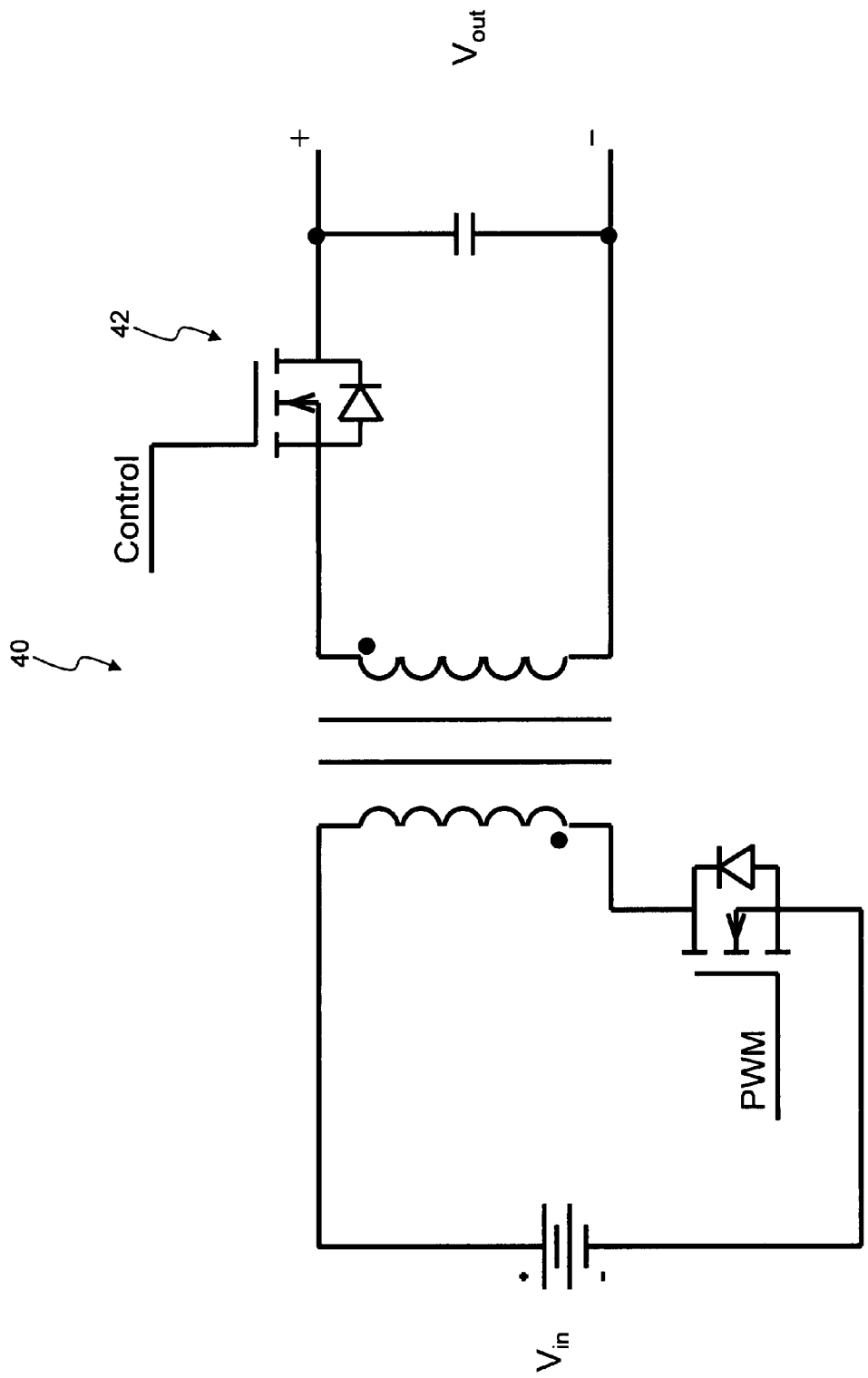
FIG. 4 is a circuit diagram of a single output flyback converter with a synchronous rectifier.
Figure 5:
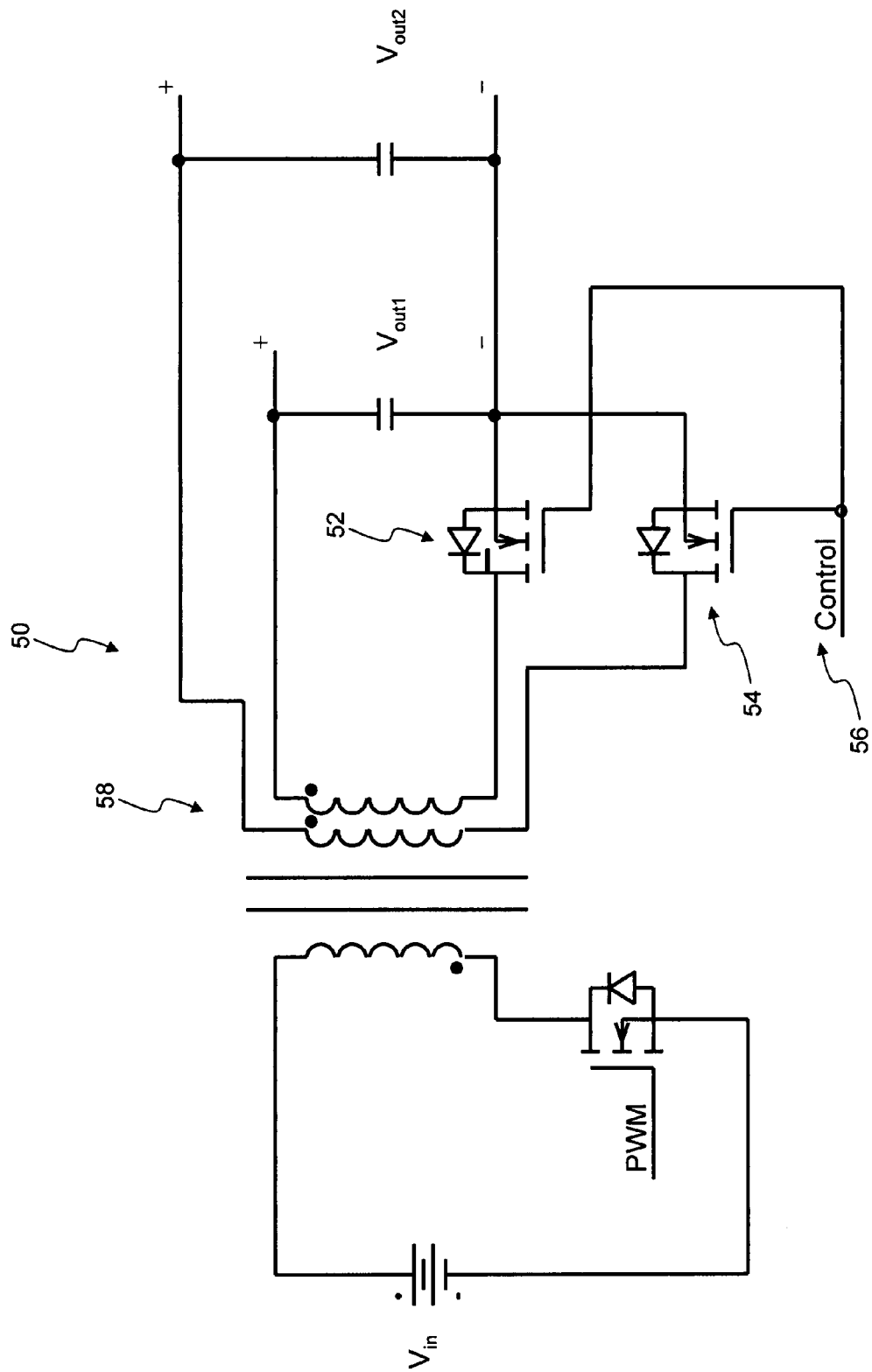
FIG. 5 is a circuit diagram of a dual output flyback converter with a synchronous rectifier.
Figure 6:
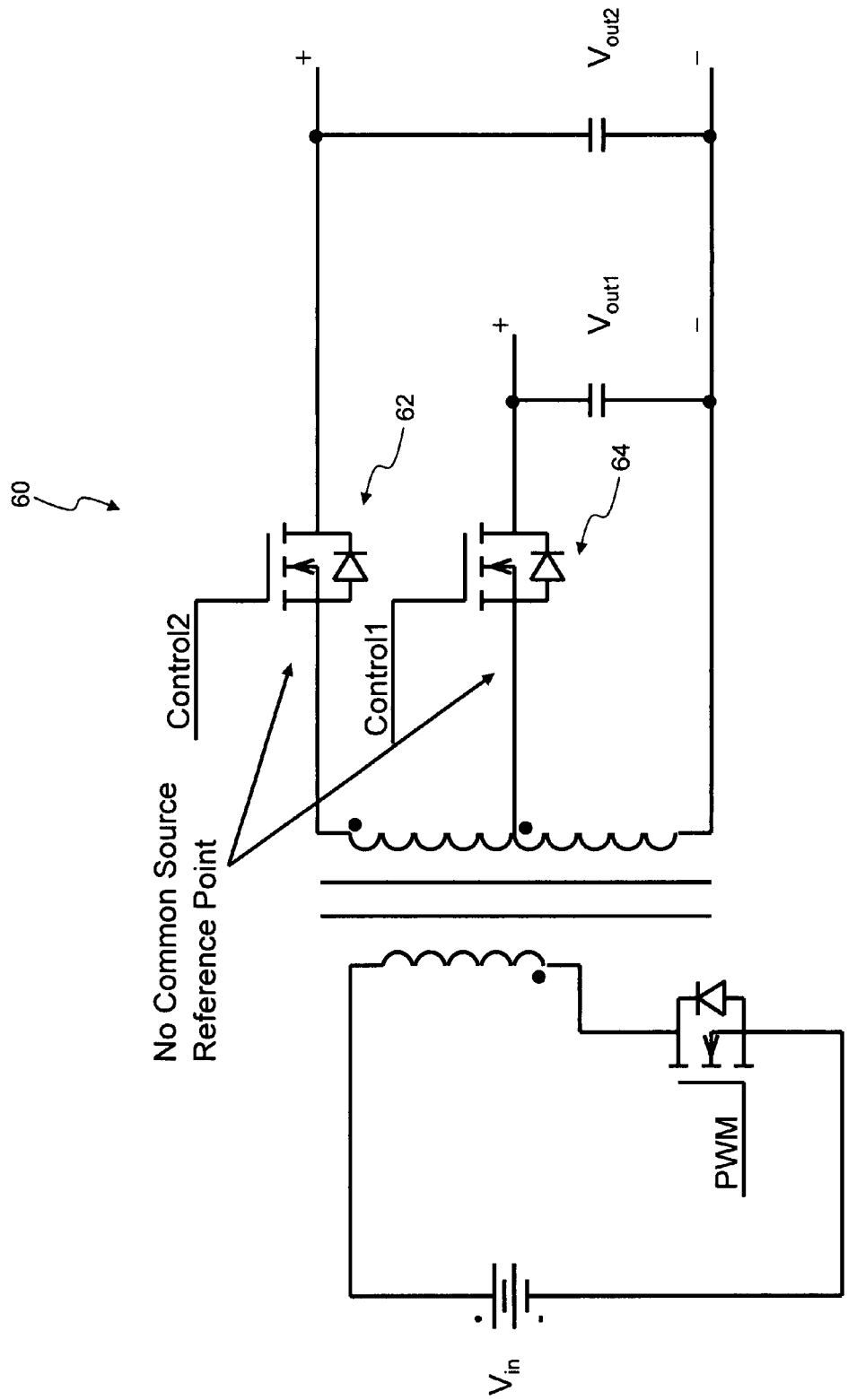
FIG. 6 is a circuit diagram of a dual output flyback converter with stacked secondary and synchronous rectifiers with MOSFET gate controls having different source reference voltages.
Figure 7:
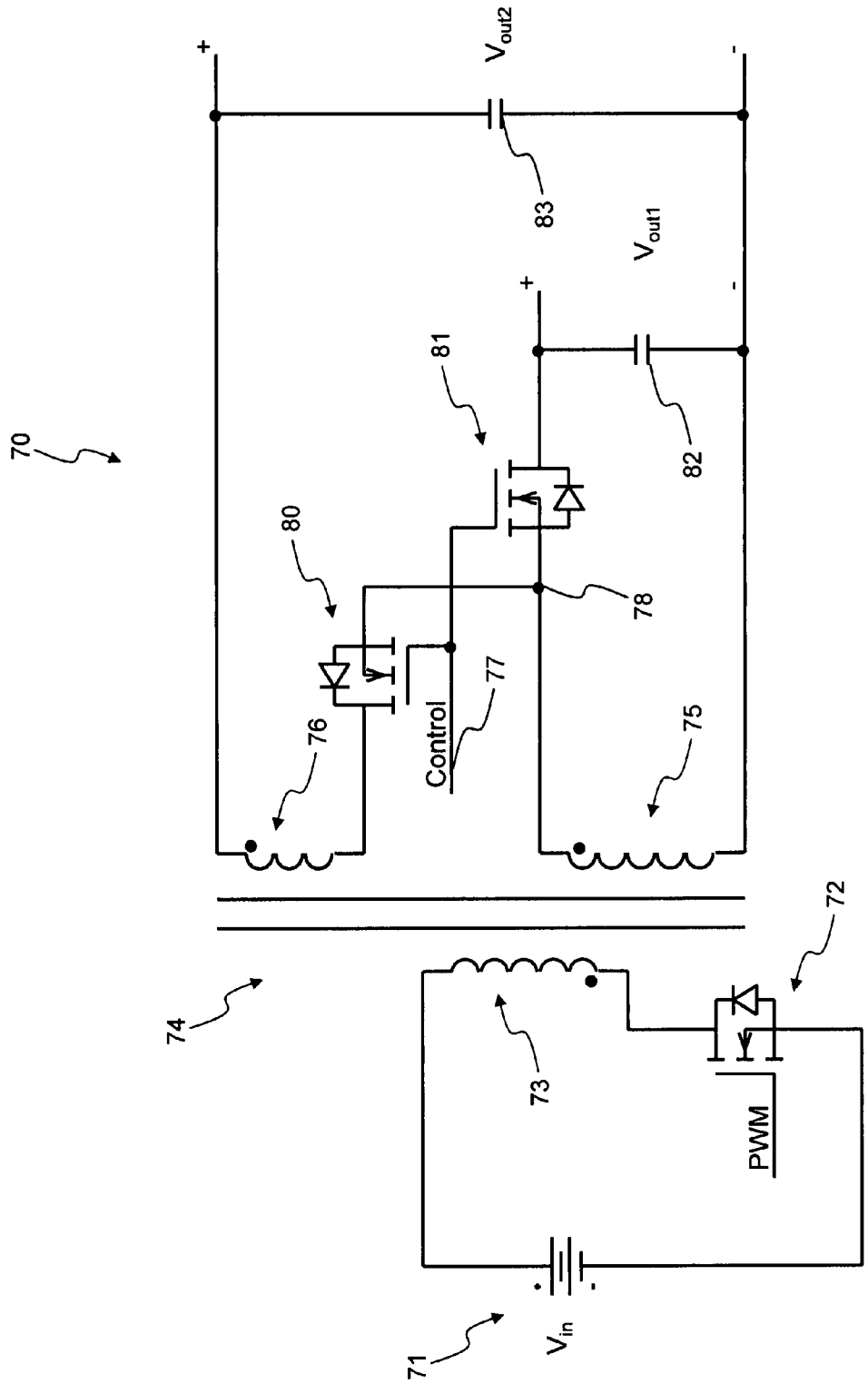
FIG. 7 is a circuit diagram of a dual output flyback converter with stacked secondary and synchronous rectifiers arranged to provide a common reference for the rectifier gate control.

Referring to FIG. 7, a dual output flyback converter 70 with stacked secondary windings 75,76 and synchronous rectifiers 80,81 arranged to provide a common reference 78 for the rectifier 80,81 gate control is illustrated according to an exemplary embodiment of the present invention. The dual output flyback converter 70 includes an input voltage 71, a switch 72 gated with a pulse width modulated (PWM) signal, a transformer 74 including a primary winding 73 and stacked secondary windings 75,76, the synchronous rectifiers 80,81 gated with a common control signal 77, and capacitors 82,83 on the outputs, $V_{out1}$ and $V_{out2}$. The dual output flyback converter 70 eliminates the complexity of multiple control voltages by arranging the synchronous rectifier 80,81 MOSFETs in such a manner that they operate with a common source 78 potential while still providing for the use of a stacked output winding 75,76. With a common source 78 potential a single rectifier control voltage 77 can be used to operate the rectifiers 80,81 for multiple outputs greatly simplifying the control circuit.

Figure 8:
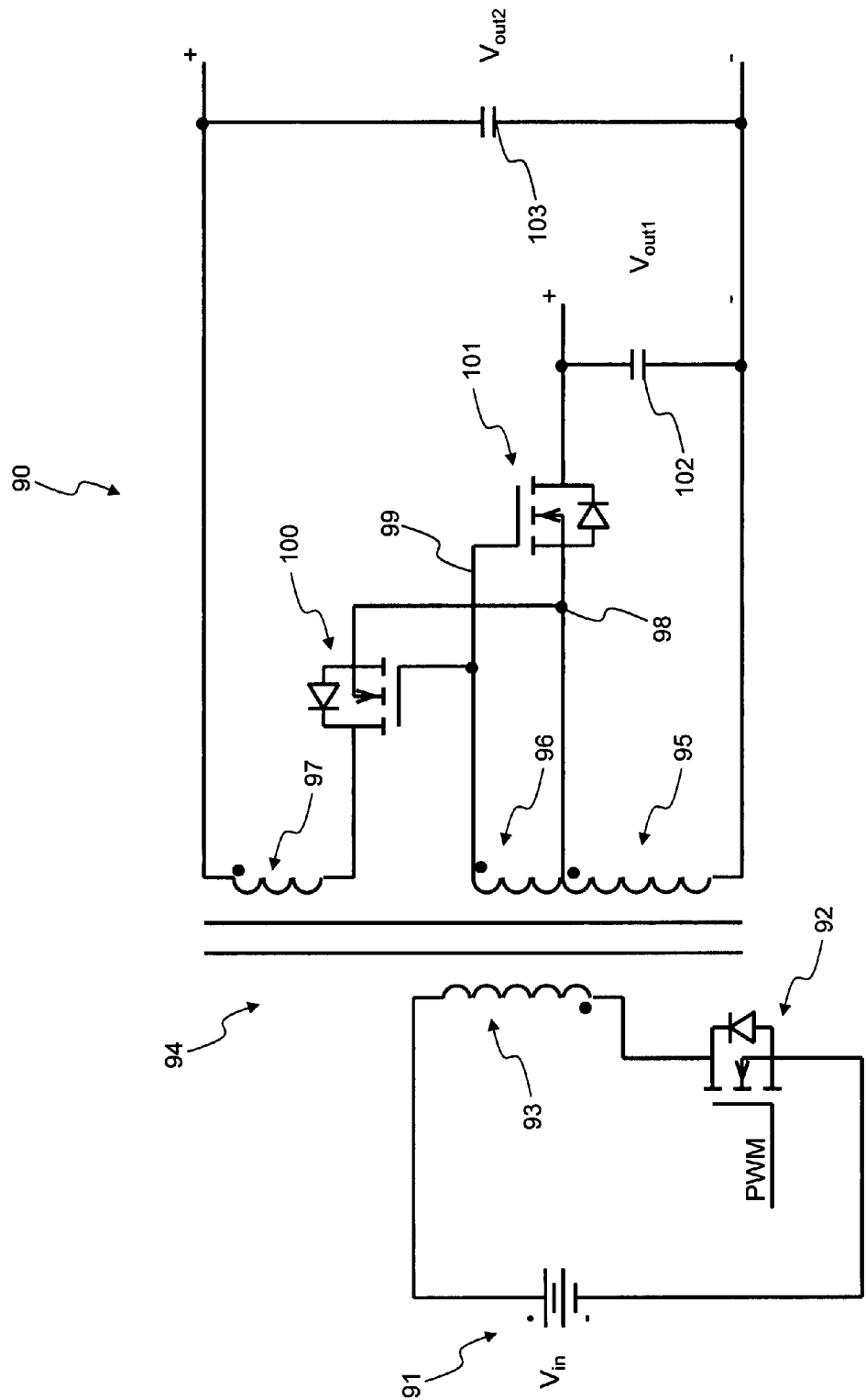
FIG. 8 is a circuit diagram of a dual output flyback converter with stacked secondary and synchronous rectifiers arrange to provide a common reference for a self driven rectifier gate control where the rectifier control requires only a single control winding.

Referring to FIG. 8, a dual output flyback converter 90 with stacked secondary windings 95,97 and synchronous rectifiers 100,101 arranged to provide a common reference 98 for a self driven rectifier gate control where a rectifier control 99 requires only a single control winding 96 is illustrated according to an exemplary embodiment of the present invention. The dual output flyback converter 90 includes an input voltage source 91, a switch 92 gated with a pulse width modulated (PWM) signal, a transformer 94 including a primary winding 93 and stacked secondary windings 95,97, the synchronous rectifiers 100,101 gated with a common control signal 99, and capacitors 102,103 on the outputs, $V_{out1}$ and $V_{out2}$. The synchronous flyback converter 90 can be configured to operate in a self driven, forced CCM, mode of operation with the addition of only the single control winding 96 to the flyback transformer 94. The use of a single winding 96 to control all of the synchronous rectifiers 100,101 is beneficial as it reduces the transformer 94 complexity and pin count thus reducing the transformer 94 cost and dimensions.

Figure 9:
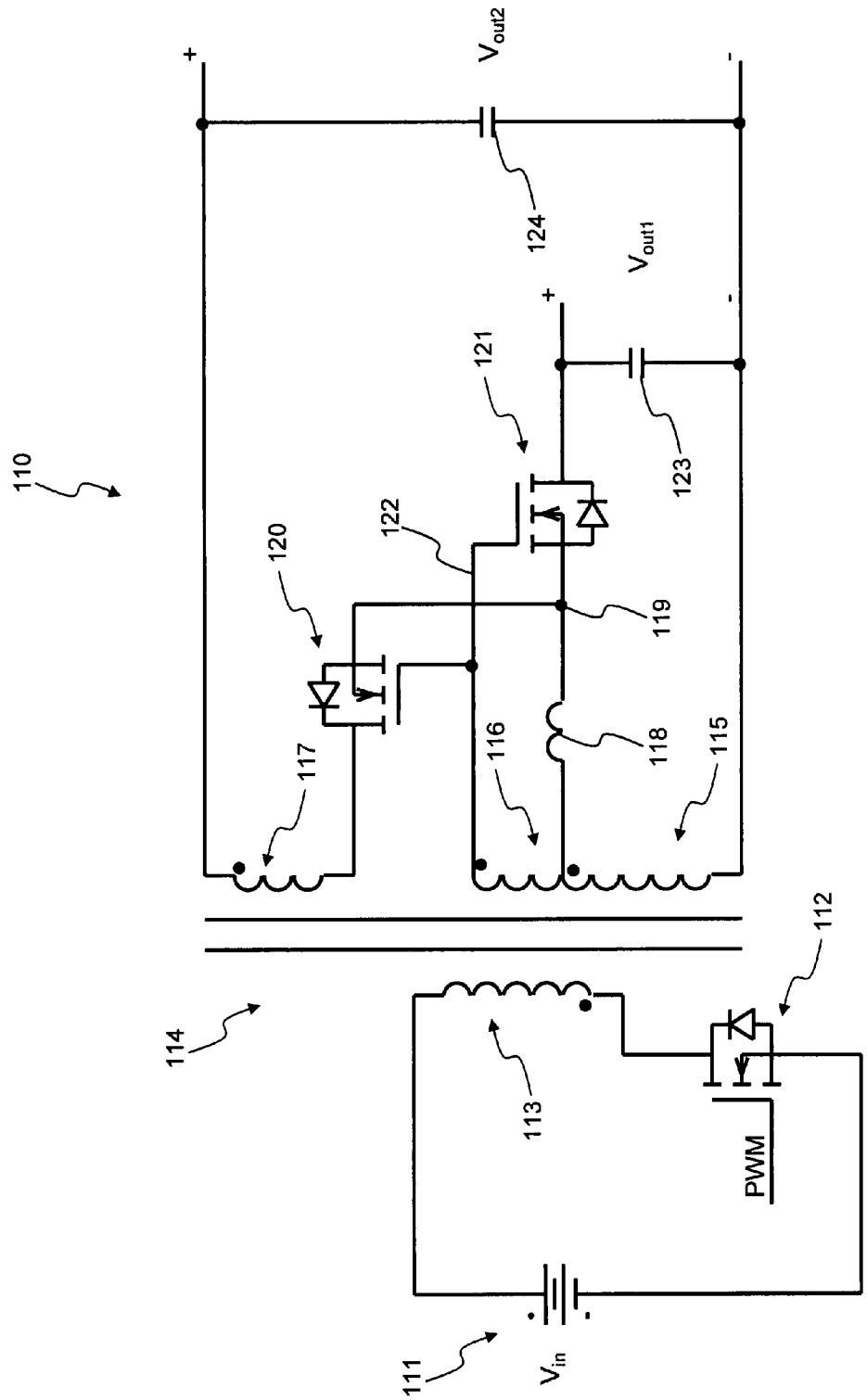
FIG. 9 is a circuit diagram of a dual output flyback converter with a commutation assist inductor.

Referring to FIG. 9, a dual output flyback converter 110 with a commutation assist inductor 118 is illustrated according to an exemplary embodiment of the present invention. The flyback converter 110 includes an input voltage 111, a switch 112 gated with a pulse width modulated (PWM) signal, a transformer 114 including a primary winding 113 and stacked secondary windings 115,117, synchronous rectifiers 120,121 gated with a common control signal 122, and capacitors 123, 124 on the outputs, $V_{out1}$ and $V_{out2}$. The transformer leakage inductance is a parasitic parameter of the transformer design and as such is notoriously difficult to control accurately. In the exemplary embodiment of FIG. 9, another modification to the flyback topology is shown with the addition of a low-valued, external "commutation assist" inductor 118 in the path(s) of the power winding(s). This inductor 118 can be a discrete component or it can be formed with an appropriately designed printed circuit board (PCB) trace inductor. This permits the transformer 114 to be designed using well-understood techniques to minimize the leakage inductance. The "commutation assist" inductor 118 should not be confused with the output inductor in a forward converter. The commutation inductor has a very low value of inductance and stores a negligible amount of power that power is actually dissipated during switching rather than being transferred to the output. As can be seen from FIG. 9, an additional advantage of the proposed flyback topology variant is that even when a stacked winding configuration is utilized only a single commutation assist inductor 118 is required; whereas in a design using the classical approach, an inductor would be required for each output.

Figure 10:
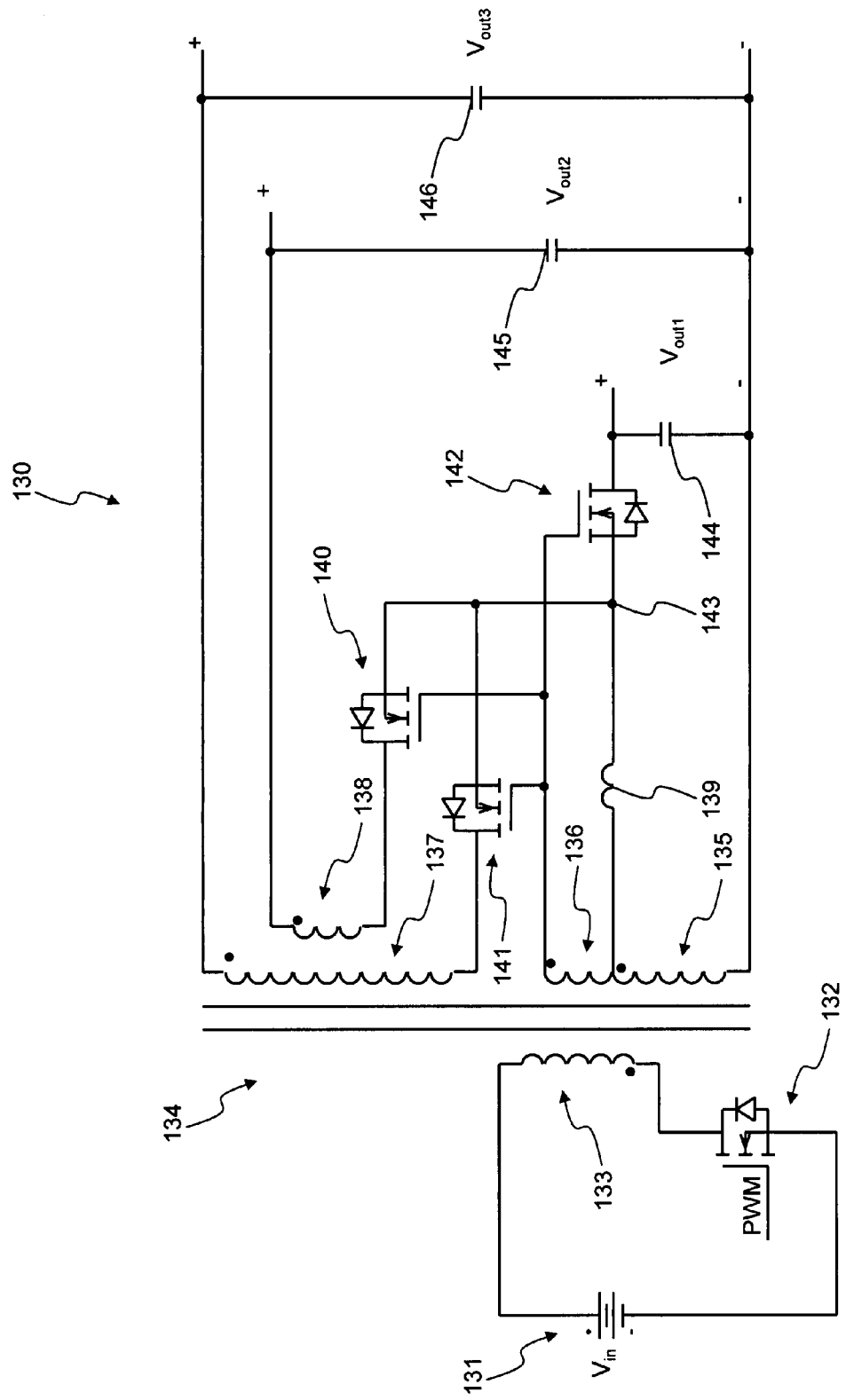
FIG. 10 is a circuit diagram of a flyback converter illustrating a multi-output variant.

Referring to FIG. 10, a multi-output flyback converter 130 with a commutation assist inductor 139 is illustrated according to an exemplary embodiment of the present invention. The flyback converter 130 includes an input voltage 131, a switch 132 gated with a pulse width modulated (PWM) signal, a transformer 134 including a primary winding 133 and stacked secondary windings 135,137,138, synchronous rectifiers 140,141,142 gated with a common control signal 143, and capacitors 144,145,146 on the outputs, $V_{out1}$, $V_{out2}$ and $V_{out3}$. Similar to FIG. 9, the external "commutation assist" inductor 139 in the path(s) of the power winding(s) to minimize leakage inductance. Those of ordinary skill in the art will recognize the proposed circuit of the present invention can easily be extended to designs with more outputs.

Figure 11:
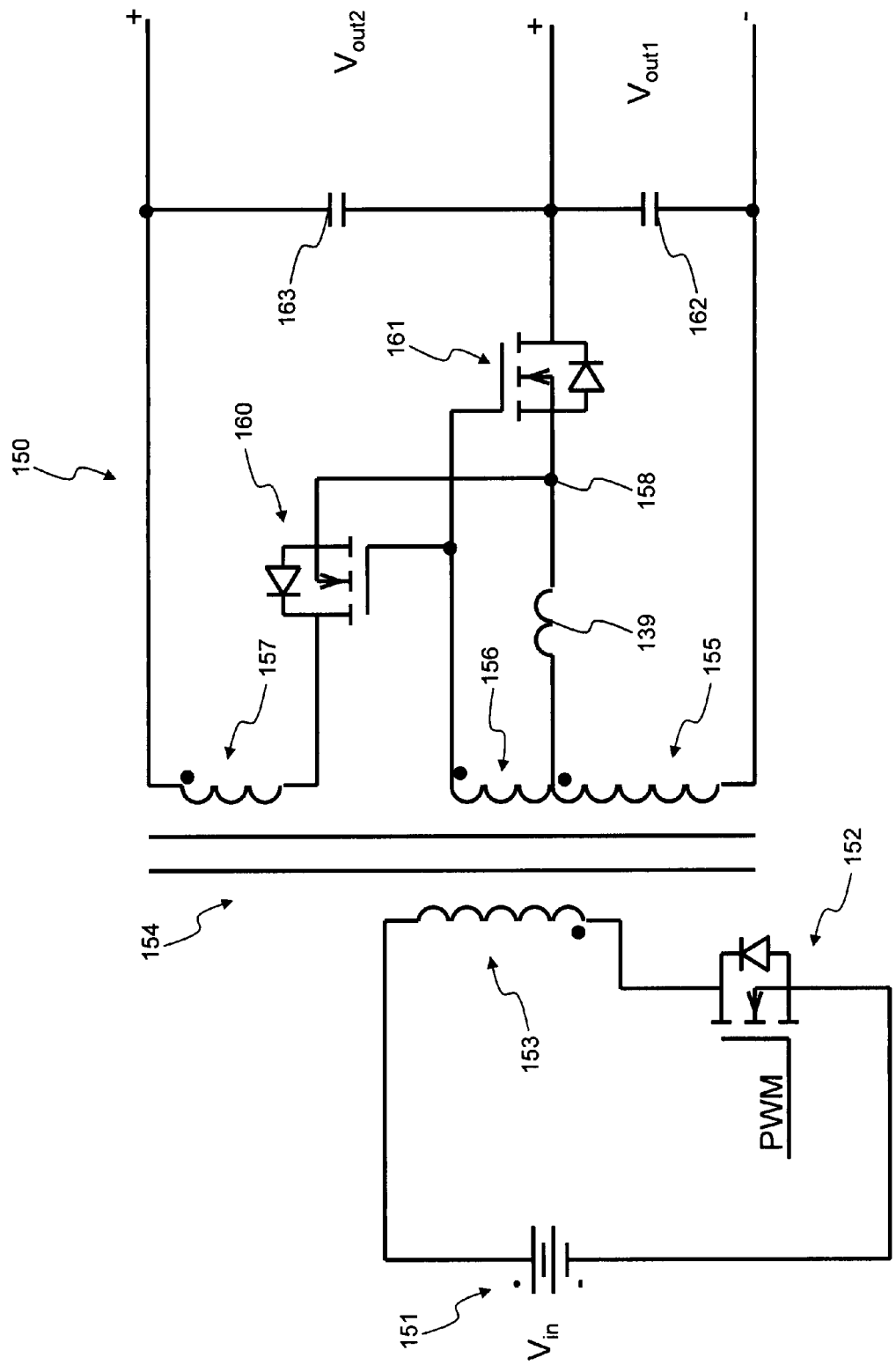
FIG. 11 is a circuit diagram of a flyback converter illustrating a stacked output capacitor variant.

Referring to FIG. 11, a flyback converter 150 with stacked output capacitors 162,163 is illustrated according to an exemplary embodiment of the present invention. The flyback converter 150 includes an input voltage 151, a switch 152 gated with a pulse width modulated (PWM) signal, a transformer 154 including a primary winding 153 and stacked secondary windings 155,157, synchronous rectifiers 160,161 gated with a common control signal 158, and stacked capacitors 162,163 on the outputs, $V_{out1}$ and $V_{out2}$.

Advantageously, the present invention simplifies the gate drive requirements of the MOSFET rectifiers when using both a stacked output winding configuration and synchronous rectification. In particular, when relying on a self driven synchronous rectification arrangement, only a single control winding is required to operate all of the synchronous rectifiers. This reduces the cost and size of the transformer by enabling the use of a lower pin count winding bobbin. Furthermore the application of a "commutation assist" inductor to the self-driven variant of the invention eliminates the reliance on the poorly controlled transformer leakage inductance, thus resulting in a design which is less sensitive to variations in the transformer construction improving the design yield and reliability. In summary, the proposed invention achieves improved performance while maintaining a minimum size and cost.

Although the present invention has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present invention and are intended to be covered by the following claims.

What is claimed is:

1. A dual-output flyback converter with stacked secondary windings and synchronous rectifiers arranged to provide a common reference for rectifier gate control, comprising:
    a transformer comprising a first secondary winding and second secondary winding, wherein the first secondary winding and the second secondary winding are in a stacked configuration;
    a first synchronous rectifier connected to the first secondary winding; and
    a second synchronous rectifier connected to the second secondary winding;
    wherein the first and second synchronous rectifiers are arranged to provide a common reference for gate control of the first and second synchronous rectifier.

2. The dual-output flyback converter of claim 1, wherein a single rectifier control voltage is utilized to operate the first and second rectifiers.

3. The dual-output flyback converter of claim 1, wherein the first and second rectifiers comprise a MOSFET.

4. The dual-output flyback converter of claim 1, further comprising a control winding on the transformer operable to control the first and second synchronous rectifiers, wherein the control winding is between the first secondary winding and the second secondary winding in the stacked configuration.

5. The dual-output flyback converter of claim 4, wherein the dual-output flyback converter is self driven in a forced continuous-current mode of operation.

6. The dual-output flyback converter of claim 4, further comprising a commutation assist inductor in the path of the control winding, wherein the commutation assist inductor minimizes leakage inductance.

7. The dual-output flyback converter of claim 1, further comprising stacked output capacitors.

8. A multiple-output flyback converter with stacked secondary windings and synchronous rectifiers arranged to provide a common reference for rectifier gate control, comprising:
    a transformer comprising a plurality of secondary windings, wherein each of the plurality of secondary windings are arranged in a stacked configuration; and
    a plurality of synchronous rectifiers arranged to provide a common reference for gate control of the plurality of synchronous rectifiers;
    wherein each of the plurality of synchronous rectifiers are connected to a corresponding stacked secondary winding of the plurality of secondary windings; and
    wherein there is a synchronous rectifier for each of the plurality of secondary windings.

9. The multiple-output flyback converter of claim 8, wherein a single rectifier control voltage is utilized to operate the plurality of synchronous rectifiers.

10. The multiple-output flyback converter of claim 8, wherein each of the plurality of synchronous rectifiers comprises a MOSFET.

11. The multiple-output flyback converter of claim 8, further comprising a control winding on the transformer operable to control the plurality of synchronous rectifiers, wherein the control winding is between two of the plurality of secondary windings in the stacked configuration.

12. The multiple-output flyback converter of claim 11, wherein the multiple-output flyback converter is self driven in a forced continuous-current mode of operation.

13. The multiple-output flyback converter of claim 8, further comprising a plurality of stacked output capacitors.

14. A flyback converter with stacked secondary windings and synchronous rectifiers arranged to provide a common reference for rectifier gate control, comprising:
    an input voltage source connected to a transformer primary and a switch;
    a transformer comprising a plurality of secondary windings, wherein the plurality of stacked secondary windings are coupled to the transformer primary through a core, and wherein each of the plurality of secondary windings are arranged in a stacked configuration;
    a plurality of synchronous rectifiers, wherein each of the plurality of synchronous rectifiers are connected to a corresponding stacked secondary winding of the plurality of stacked secondary windings, and wherein the plurality of synchronous rectifiers are arranged to provide a common reference for gate control of the plurality of synchronous rectifiers; and
    a plurality of capacitors connected to the outputs of the plurality of secondary windings.

15. The flyback converter of claim 14, wherein the plurality of capacitors are stacked.

16. The flyback converter of claim 14, wherein a single rectifier control voltage is applied to the common reference to operate the plurality of synchronous rectifiers.

17. The flyback converter of claim 14, wherein each of the plurality of synchronous rectifiers comprises a MOSFET.

18. The flyback converter of claim 14, further comprising a control winding on the transformer operable to control the plurality of synchronous rectifiers, wherein the control winding is between two of the plurality of secondary windings in the stacked configuration.

19. The flyback converter of claim 14, wherein the multiple-output flyback converter is self driven in a forced continuous-current mode of operation.

* * * * *